United States Patent
Zhu et al.

(10) Patent No.: US 8,726,842 B2
(45) Date of Patent: May 20, 2014

(54) ANIMAL MEMORY TRAINING SYSTEM WITH CLOSED ROTARY MAZE

(75) Inventors: Qiwen Zhu, Liaoning (CN); Weiping Cao, Liaoning (CN); Jianwen Zhao, Liaoning (CN); Lihong Shang, Liaoning (CN); Baoping Kuang, Liaoning (CN); Kewei Wang, Liaoning (CN)

(73) Assignee: Shenyang Medical College, Liaoning (CN)

( * ) Notice: Subject to any disclaimer, the term of this patent is extended or adjusted under 35 U.S.C. 154(b) by 0 days.

(21) Appl. No.: 13/988,344

(22) PCT Filed: Mar. 16, 2011

(86) PCT No.: PCT/CN2011/071860
§ 371 (c)(1),
(2), (4) Date: May 20, 2013

(87) PCT Pub. No.: WO2012/119321
PCT Pub. Date: Sep. 13, 2012

(65) Prior Publication Data
US 2013/0233249 A1   Sep. 12, 2013

(30) Foreign Application Priority Data

Mar. 7, 2011   (CN) .......................... 2011 1 0052621

(51) Int. Cl.
*A01K 15/02*   (2006.01)
(52) U.S. Cl.
USPC .......................................... 119/452; 119/421
(58) Field of Classification Search
USPC .......................................... 119/452, 417, 421
See application file for complete search history.

(56) References Cited

U.S. PATENT DOCUMENTS

| | | | |
|---|---|---|---|
| 4,574,734 A * | 3/1986 | Mandalaywala et al. | 119/421 |
| 5,054,427 A | 10/1991 | Hoover | |
| 5,868,102 A | 2/1999 | Petty | |
| 6,644,244 B2 * | 11/2003 | Mauderli et al. | 119/417 |
| 6,837,184 B2 * | 1/2005 | Gondhalekar et al. | 119/421 |

(Continued)

FOREIGN PATENT DOCUMENTS

| CN | 1817325 A | 8/2006 |
|---|---|---|
| CN | 101884306 A | 11/2010 |

*Primary Examiner* — Yvonne Abbott

(57) ABSTRACT

An animal memory training system with a closed rotary maze comprises a maze device and a stimulating device. A rotary wheel (6) driven by a motor (4) is provided on the bottom of the case (1) of the maze device. The motor (4) is set in a central column, and its output shaft is tightly connected with the rotary wheel (6) along the central column shaft direction, thus the rotary wheel (6) is driven by the motor (4) to rotate around said central column. A number of pulleys (12) are set on the lower periphery of the frame of the case (1) to support said rotary wheel (6), and a sieve-like supporting net (5) is arranged above the rotary wheel (6). The stimulating device includes an automatic manipulator stimulating device and a remote control stimulating device. Compared with the existing maze model, the rotary drive action of the training system's rotary wheel is moderate, and is more coincident with the movement actual of animals' normal physiological behavior. Further, the stimulating device can respectively realize the rewards and punishments for the experimental animals, and has the characteristics of accurate positioning, timely stimulation, complete stimulation variety, no ravage and convenient operation. The training system has overtaken the existing shortcomings of unilateral dominance in the detection of the present maze training systems, such as Y-maze and T-maze detection.

10 Claims, 14 Drawing Sheets

(56) References Cited

U.S. PATENT DOCUMENTS

| | | |
|---|---|---|
| 7,970,476 B2 * | 6/2011 | Chapin et al. .................. 607/48 |
| 8,578,882 B2 * | 11/2013 | Araujo ....................... 119/51.01 |
| 2003/0024482 A1 | 2/2003 | Gondhalekar et al. |
| 2010/0206241 A1 | 8/2010 | Ragonetti et al. |

* cited by examiner

ANIMAL MEMORY TRAINING SYSTEM WITH CLOSED ROTARY MAZE

BACKGROUND OF THE INVENTION

The present invention relates to a model applied in researching and building training method about learning and memory behavior of animals, especially relates to an animal memory training system with closed rotary maze. The present invention can be applied in the field of neurophysiology, neuropharmacology, psychology etc.

At present, animal behavior experiment is a significant and indispensable means to research higher brain function and other neurosciences problems. Especially, it plays a more important role in behavioral medicine researching aspect, such as neurophysiology, neuropharmacology etc. Maze experiment, a classical project of behavior experiment, is one of the most commonly used experiments for researching learning and memory function of rats (or mice), and is also a commonly used animal model of cognitive drug screening.

In a maze task, the instrument of the maze device can tell the animals that what they should do (like the instruction of the experiment done by human beings). In this task, the researchers always refer to these two concepts, working memory and reference memory. For accomplishing a task, animals require primarily the reference memory, which show that animals learn relevant information (such as the location of spatial clues, the structure of the maze, experiment rules etc.) between each trail of the task. Therefore, in the process of animals establishing reference memory, reference information should exist in the course of all trails. In laboratory circumstance, the working memory of animals is defined as the ability of persisting information in each trail of a experiment session. By comparison, working memory is always different in each trail, and is defined as the ability of animals to persist information (the place they have arrived) in each trail. After a trail, rats can erase the specific working memory of this trail, and keep the reference memory permanently. Therefore, the working memory only contribute to a trail, however, the reference memory is long-term memory.

Maze device in the prior art mainly includes the following types:

1. Dry maze model for measuring the working memory of animals. Dry mazes mainly refer to radial arm mazes, Y-mazes, T-mazes etc. Since reward and punishment is not provided in Y-mazes, T-mazes or Barnes mazes, and completely take advantage of the discovery instinct of animals, the animals is motivated by the hunger motivation to perform learning and memory in this type of maze task. So, the food intake of animals should be strictly controlled, thus their body weight should be decreased to 85% of original. However, the problem exist in this method is that the non-learning factor, such as the instinct of animals walking around the arm, the hunger lever, and so on, will influence on the experiment result.

2. Water maze model for measuring the working memory of animals. Morris Water Maze (MWM) is a classical water maze model, which performs learning and memory by taken advantage of the escaping motivation of seeking platform to prevent from drowning. In addition, on the bases of dry mazes, the experiment device is filled with water to form 8-arm radial water mazes, water T-mazes, or water Y-mazes, so as to eliminate the influence of smell clues on the experiment result. Employing water mazes to perform behavior test, it is not required to control the food and water intake of animals, and demands a short period, about one week, for training animals. It also enables to establish an image automatic acquisition and analysis system using computer, and enables to draw relevant histograms and running track diagrams, according to the collected data, so as to further analysis and discuss the experiment result by the researcher. Since the swimming latency of animals is correlated with their kinesiological condition, the shortcoming of MWM is that drugs affected animals' kinesiological condition, and animals' condition probably influence on the normal experiment result. Moreover, the experiment could be performed just in a few well equipped laboratories, because of the demand of monitoring system and analysis software. Lots of factors should be considered to design the experiment procedure, as well as experimenters is required to have certain knowledge of neurophysiology, cognitive physiology, and mathematical statistics, makes it difficult to perform experiment and to explain the result, and limits the wide application of this maze. Because of too much energy consumption, and too much body temperature loss, it is difficult for old and frail rats to accomplish task. Of course, not all mouse strains can be employed to perform Morris maze test. BALB/C mice are unable to learn how to perform this task (never make progress as learning days increasing). 129/SvJ mice show poor performance, and show tremendous difference between individuals. Some strains, like 129/SvJ mice strain, because of age-related visual pathway lesions, makes it difficult to accomplish learning and memory task based on visual sense, when they are old. Because of the presence of alopecia in C57BL/6 mice strain, some mice probably feel depressed, combined with ulcerative dermatitis, it affects the swimming abilities of mice and finally affects the experiment performance. This maze process is not sensitive to learning and memory ability slightly dropping off. Submerging animals into water maybe cause endocrine or other stress affects, the interaction between the later and cerebral lesions or pharmacological action exists uncertainty. The experiment need to be done by manual operation even via an automatic monitoring system, it makes the experiment to be boring. The experiment occupies too large testing area.

3. Other rats behavior model. One trial passive avoidance and step-down (or climbing pole) model are two simple models for researching learning and memory, and are suitable for researching memory retention and memory consolidation. These two models test the memory retention and memory consolidation via recording how long the animals never get into the small chamber with electric shock or never jump away from the platform, since suffered an electrical shock. New object recognition experiment is a model to test non-spatial working memory abilities of animals, which apply the principle that animals tend to discover new objects by nature. If the animals have remember pre-existing objects, the animals should expend less discovery time on the pre-existing objects the than the new objects, in test procedure.

In conclusion, aforesaid classical maze training systems have different extent of limitations, which includes various human factors, troublesome technical operation, and lack of comprehensive influence factors stimulated by electric, sound (noise), and light condition. In order to solve aforesaid problems, the inventor of the present invention has invented and published a solution in patent application CN200610045868.9, through long-term research. That is a mouse auditory and vision memory model and its intelligent behavior test system. The auditory and vision memory model comprises a maze with a data acquisition section, a destination section, and connecting channel thereof. A circular dark box type maze with multiple channels is used as the maze device, whose case with a lid and a barrier bottom, is divided into 3 sections by partitions. One of the sections is destination section, and the others are data acquisition sections. Some similar caves-like channels with adjustable one-way doorway are equipped at the bottom of the partitions, at equal distances. Two groups of infrared transmitting and receiving photoelectrical elements are provided at the side of the caves-like channel doorway. In each section, controlled lighting is provided. In each section of the barrier bottom, an electrical shock conductor controlled randomly, generating different gradient voltage strap. A hard light generating unit, a noise generating unit, and a video tracking unit are provided at the top of the central pillar in the case. Said auditory and vision memory model use controlled lightings cooperate with the habit of rat chasing darkness, propels rat to move voluntarily in the case. Combined with electric shock generated from the different gradient voltage strap of the conductor, the rat is controlled and propelled to passively move. Said system can be applied on fasted rats or non-fasted rats. Unlike the water maze training propel animals to swim, combined the voluntary movement of rats' natural moving mode, with the passive movement propelled by the gradient voltage, the rat is prevented from leaving the predetermined channel, and from staying for different time in every sections. The time data get more accurate. The animals' track in the maze is detected correctly, at real time, by the infrared transmitting and receiving photoelectrical elements equipped at side of the doorway. During using process, the inventor found out that said maze system has the disadvantages as following. The electric shock propelling the rat is not moderate enough. The propelling of gradient voltage is easy to hurt animal seriously or not. The device is complicate. Moreover, the device is not perfect, because animals may complete the experiment by smell. The stimulating system has defects of failure stimulating accurately and in time, with single type of stimulating. Electric stimulation and wounding stimulation cause side effect on animals. And operation is not inconvenient. Aforesaid defects effect the experiment result, and weaken the accuracy of the experiment data.

Generally speaking, the maze training system in the prior art needs to be improved, according to the actual demand of establishing a mode for animals learning and memory behavior training method.

BRIEF SUMMARY OF THE INVENTION

The object of the present invention is providing an animal memory training system with a closed rotary maze, which is designed more reasonably. The shortcomings of unilateral dominance in existing maze test, such as Y-maze, T-maze, is overcome. Compared to existing dark box type maze mode, the propelling of the base plate (rotary wheel) is moderate, conforms the realistic situation of animals' normally physiological behavior, do not hurt animals. Moreover, the automatic flushing and drainage system prevent animals from completing experiment via odors. The present invention combined the advantages of Morris water maze, Y-maze, and dry maze. The automatic mechanical arm stimulating unit and the wireless remote control stimulating unit are applied as the stimulating system, realizes rewards and punishment on animals. The present invention has advantages of accurate positioning, stimulating on time, various stimulations, woundless, and simple operation.

The solution in the present invention is described as following. An animal memory training system with closed rotary maze, comprising: a maze device and a stimulating device; several partitions are provided between an inner wall and a central pillar of a round case in said maze device, thus said round case is divided into a plurality of data collecting sections and destination sections; at the bottom of each partition is provided with several doorways distributed at equal distance, which looks identical; is characterized in that, a rotary wheel driven by a motor is arranged at the bottom of case in said maze device, the motor is arranged on the central pillar, the output shaft of the motor is fastened to the center of rotary wheel along the axis of central pillar, and the rotary wheel rotates around the central pillar driven by the motor, at the lower part of the frame in said case is equipped with several pulleys supporting the rotary wheel 6, on the top of the rotary wheel is provided with a sieve-like supporting net;

the stimulating device consists of an automatic mechanical arm stimulating unit and a remote control stimulating unit;

said automatic mechanical arm stimulating unit comprises 4 components, including a rectangular coordinate robot positioning system, a PLC control system, a rat position detecting system, and a stimulating system; said rat position detecting system consists of 4 opposite-type photoelectric sensors placed in the doorways of the maze device; two sensors, arranged on the top and at the bottom of the doorways, constitute a detecting unit, and two detecting units form two detecting spots, distributed in front or behind of the doorway; said stimulating system includes 3 kinds of terminal stimulating mechanism, which is in form of a mechanical arm with 3 tubes, corresponding to water, gas, and food stimulation respectively; said stimulating system controls supplying of water, gas, and food, via PLC control system; when located in the position of rat, the electromagnetic valve equipped at the end of mechanical arm opens, and inflicts corresponding stimulation, according to the signal of passing through the doorway, which is send from PC;

said remote control stimulating unit comprises an electric stimulating module, a sound stimulating module, a mechanical vibrating stimulating module, a wireless transmitting module, a wireless receiving module, and a relay driving module; the electric stimulating module, the sound stimulating module, the mechanical vibrating stimulating module, the wireless transmitting module, the wireless receiving module, and the relay driving module; are assembled and fixed on a carrier, which is tied on the rat's body; said wireless transmitting module sends wireless signals corresponding to the signals of rats passing through the doorway, after the wireless receiving module received the wireless signals, one variety of stimulating is selected, and the relay driving module works, then electric, sound, mechanical vibrating stimulation, or combination thereof, is inflicted on rats.

A water trough is arranged under the rotary wheel of the maze device, thus forming a feces collection and treatment equipment; a water pipe, on which uniformly distributed several spraying outlets, is arranged along the periphery of the trough; under the trough is provided with a support frame and a drain outlet; in the trough is provided with a water brush; under the case frame is provided with a supporting bracket with pulleys, said upper part of water brush is fixed on the bottom of the rotary wheel, and the lower part of the brush contacts the side wall and the base of trough; the water brush rotates with the rotation of rotary wheel, the lower part of the brush washes the water trough.

The circuit control system of said maze device consists of a power, a SCM, a controller of vision and smell sense, a controller of automatic flushing and drainage system; after received a control signal transited from SCM, the controller of the automatic flushing and drainage system regulates the controller of electrical valve, then switches open/close of the electrical valve arranged on the feces collection and treatment system; the water pipe arranged on the trough of said feces collection and treatment system is connected or disconnected to water resource, and the trough is washed at regular time; the sewage is discharged from the drain outlet; SCM send signal to the motor, for driving the rotary wheel 6 to rotate; the controller of vision and smell sense controls a LCD screen and an odor controller, after detected a smell signal by SCM, fresh air is supplied to a mechanical arm equipped on the training system, via an air compressor, a control valve, an odor generator, a pressure reducing valve, then the fresh air is supplied to an odor tank provided in the maze by the mechanical arm of the training system.

Six partitions of the maze device is arranged, and divided the round case into six equal angle sections, A, B, C, D, E and F, including 5 data acquisition sections and a destination sections; at the bottom of each partition is provided with 4 doorways distributed at a certain distance; on each partition is provided with a LCD screen; And a feed trough is set in the destination section.

The rectangular coordinate robot positioning system of the automatic mechanical arm stimulating unit is established based on quick linear positioning mechanisms, moves in three directions x, y, and z; the x direction, y direction and z direction of the rectangular coordinate robot are constituted of a linear positioning unit driven by synchronous toothed belt; and a servo drive system is provided as driving force to enable accurately positioning at any spatial point.

The PLC control system of said automatic mechanical arm stimulating unit comprises a CPU module and a movement control module; the CPU module and the movement control module are communicated via a main board; based on the position signal transmitted from the rat position detecting system, current position of rat is calculated by the PLC module; compared said current position to the position of rectangular coordinate robot positioning system, a path between them can be calculated; then the movement control module sends moving instruction to a servo drive system, by which the terminal stimulating mechanism, in the rectangular coordinate robot positioning system, is driven to a correct position.

At the end of mechanical arm in said automatic mechanical arm stimulating unit is provided with a removable LCD screen.

The wireless transmitting module of the remote control stimulating unit consists of a wireless remote control transmitter IC1, a time-base integrated circuit IC2, a diode D10, a potentiometer W, switches K1, K2, K3 and SCM IC7; the wireless receiving module consists of a wireless remote control receiver IC3, a decoding integrated chip IC4; the relay driving module consists of SCM IC6, relays Ja, Jb, Jc.

The wireless transmitting module controls the time-base circuit IC2, via the SCM IC7; the LED D10 is an indicator for signal transmitting; if P3.7 of the SCM IC7 output high lever, corresponding pins of the time-base circuit IC2 output low lever, the time-base circuit IC2 is reset, the wireless remote control transmitter IC1 does not send signal, and the LED D10 is off; If P3.7 of the SCM IC7 output low lever, the time-base circuit IC2 works, the wireless remote control transmitter IC1 send a set of signals, including N times of signals at intervals, and the indictor LED D10 turns on; N≥1.

The wireless remote control receiving module receives every set of signals via the wireless remote control receiver IC3; the SCM IC6 of the relay driving module identifies the variety of stimulation selected, according to the times of each set of signals, controls the normally open contacts Ja, Jb, Jc of relays to close, and inflicts stimulation.

Said manual switches K1, K2, K3 are provided corresponding to sound, vibrating and electric stimulation; the SCM IC7 of the wireless transmitting module controls the time-base integrated circuit IC2 to sent correct times of wireless signals, according to the setting state of said manual stitches K1, K2, and K3.

Said carrier tied on the rat's body adopts a piece of elastic canvas, on which is provided with a stimulating electrode, and at two ends of which is provided with two hook loops.

The present invention has advantages and excellent technical effects as following. Absorbing the advantages of classical mazes training system in the prior art, the existing dark box maze device is improved, and new stimulating unit is developed and equipped on the maze. So, the experiment effect is outstanding, and the experiment data is accurate. The advantages are obviously reflected in these aspects as following. 1. The barrier with gradient voltage at the bottom of the dark box maze is replaced by an ingenuity base plate (rotary wheel) with rotatable round design. The propelling of electrode is changed to rotating propelling, which will never hurt animals. Rat's voluntary movement combined with propelling of rotary wheel is adopted as the motivation of experiment animals exploring and reaction, which is more moderate, can be applied on fasted rats or non-fasted rats, and which conforms the realistic situation of animals' normally physiological behavior. Moreover, after each trail of the session, it is not necessary anymore to place the rat on the start point again, so the whole session can be completed without interruption, and the shortcomings of unilateral dominance in existing maze test, such as Y-maze, T-maze, is overcome to some extent. 2. A water trough is arranged under the case and the rotary wheel of the maze device, thus forming a feces collection and treatment equipment (automatic flushing and drainage system). The odor in the maze (e.g. in the doorway) is cleared away, the animals are prevented from completing experiment by odor. The present invention combined the advantages of Morris water maze, Y-maze, and dry maze (Barnes maze). 3. The stimulating system in the present invention has various stimulations, including sound, light, electric, gas, water, image, odor, etc. The automatic mechanical arm stimulating unit and the wireless remote control stimulating unit are applied to offer rewards and punishment to animals. The automatic mechanical arm stimulating unit has advantages of accurate positioning, and stimulating on time. After detected the passing through signal of animals, water, gas, food, image stimulations, or combination thereof, is inflicted on the animals. The wireless remote control stimulating system is provided on the carrier, which is tied on the animals' body, inflicts electric, mechanical vibrating, sound stimulating on animals. The shortcoming of hurting animals in existing stimulating unit is overcome. Moreover, the stimulating unit has the advantages of remote control, woundless, simple operation, synchronous working. Animals will feel like in a realistic situation of stimulation. 4. The image and data acquisition system based on computer is established in the present invention, and remote monitoring is realized according to access permissions in LAN or Internet. Starlight detection can be completed according to the nocturnal habits of animals. The maze device rotates at a certain interval (1-2 hours), and image, data is collected automatically. Observation or test by using rats' natural instincts of night behavior and discovery, give less stress on rats. So the confounding factors is reduced to some extent. 5. Early pre-adaptation phase. Animal lives in a maze similar as the test system, at rearing phase. Animals have adapted the situation since weaning other than the experiment.

BRIEF DESCRIPTION OF THE DRAWINGS

The present invention is described referring to figures as following.

Numerals in the figures are defined as following: 1 case; 2 partition; 3 LCD screen; 4 motor; 5 sieve-like supporting net; 6 rotary wheel; 7 water pipe; 8 water trough; 9 water brush; 10 supporting wheel; 11 supporting bracket; 12 pulley; 13 doorway; 14 feed trough; 15 spraying outlet; 16 drain outlet; 17 water channel; 18 gas channel; 19 food channel; 20 electromagnetic valve; 21 removable LCD screen; 22 hook loop; 23 switch; 24 hook loop; 25 stimulating electrode.

DETAILED DESCRIPTION OF THE INVENTION

The animal memory training system in the present invention, which is an apparatus for testing the spatial memory ability of rats, employs a circular dark-box maze as the behavior data collecting device, and employs a stimulating unit to propel the rats pass the doorway, to form a closed course, and to complete training. Said system records rats' running track, according to rats' voluntary movement and passive movement driven by rotary, via a data collecting unit to collect said track information. Said information is transmitted to a database in a microcomputer control system via a data bus, thus rats' movement behavior can be controlled and monitored at any time.

Firstly, the animal memory training system with closed rotary maze in the present invention comprises two parts: a maze device and a stimulating device.

Figure 1:
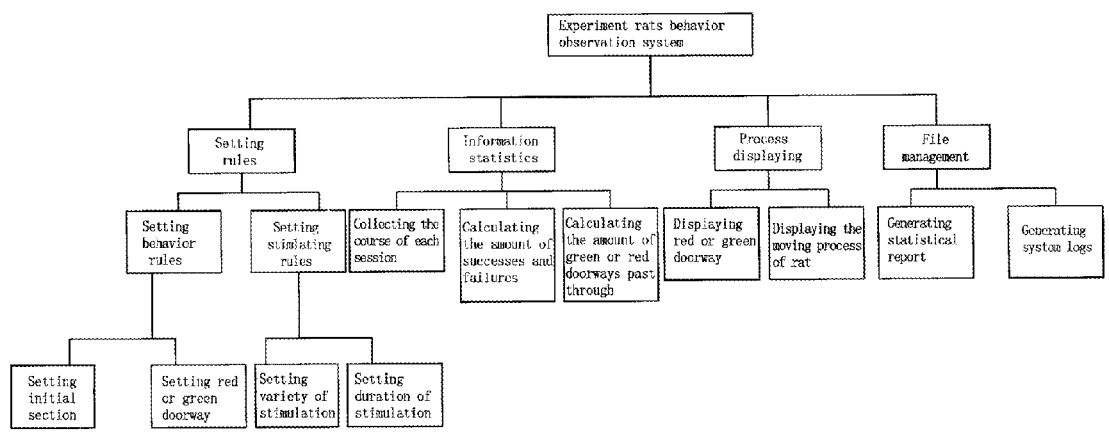
FIG. 1 is a function diagram of the present invention.
Figure 2:
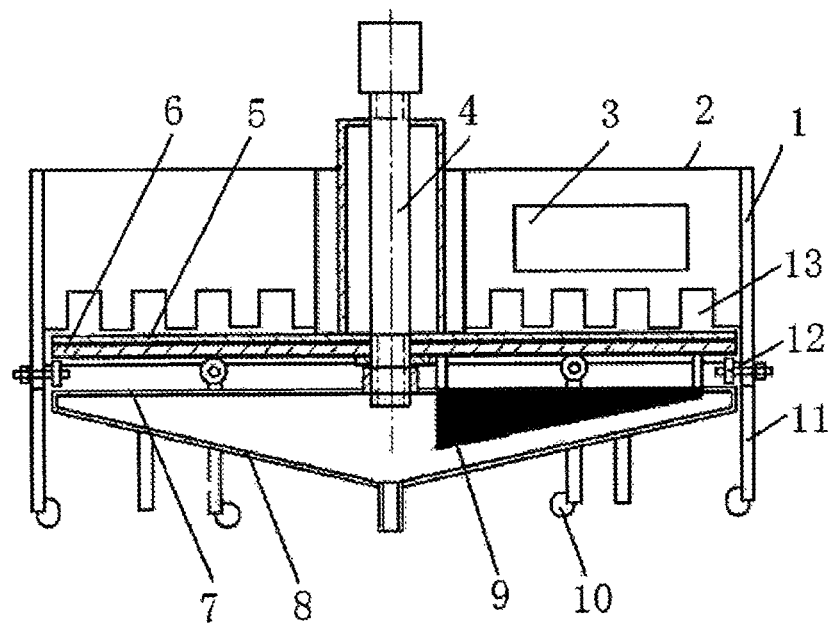
FIG. 2 is a detailed structure drawing of the maze device applied in present invention.
Figure 3:
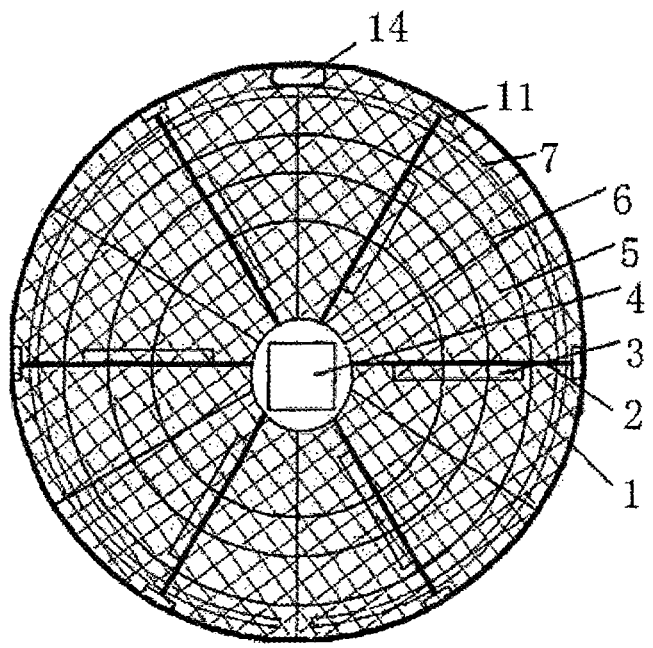
FIG. 3 is a top view of the maze shown in FIG. 2.
Figure 4:
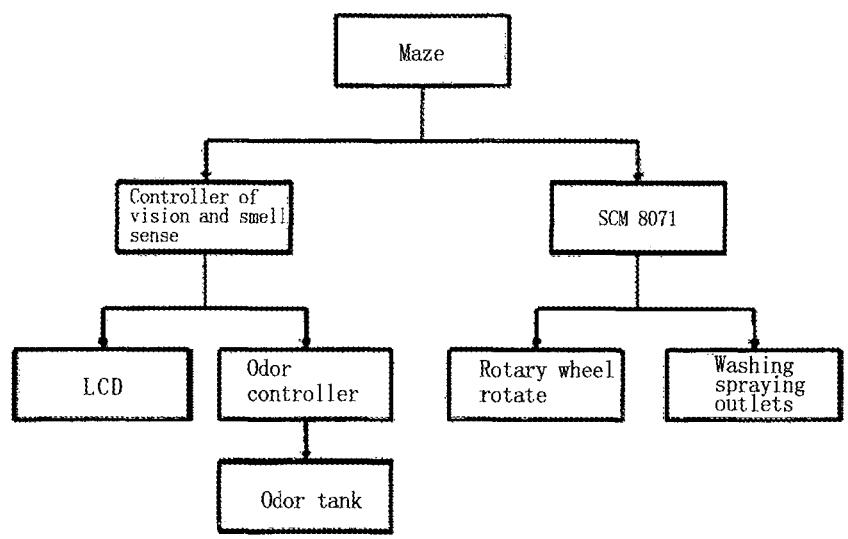
FIG. 4 is a control circuit diagram of the maze device applied in present invention.
Figure 5:
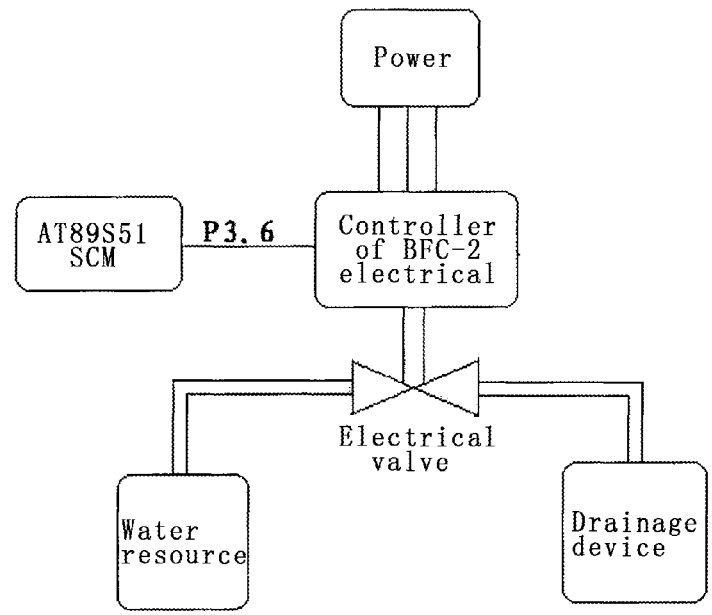
FIG. 5 is a control block diagram of the automatic flushing and drainage system in the maze device.
Figure 6:
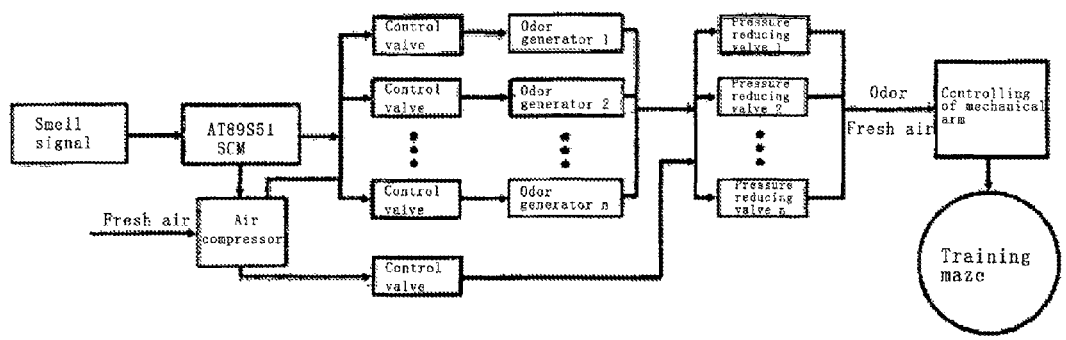
FIG. 6 is a control block diagram of the odor releasing unit in the maze device.
Figure 7:
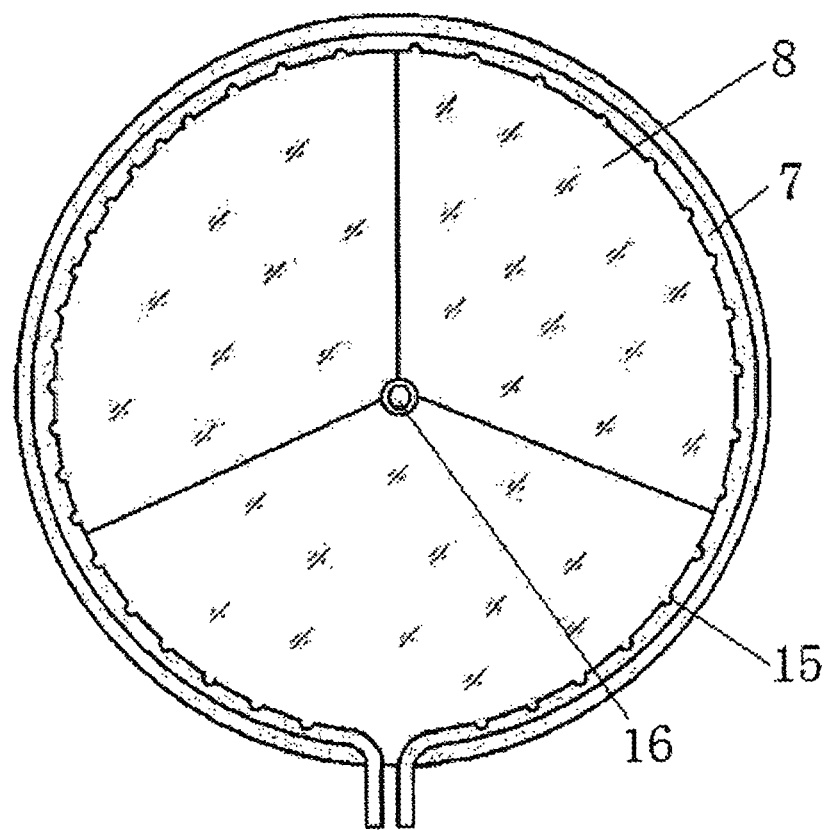
FIG. 7 is a structure drawing of the trough in the feces collection and treatment equipment of the maze device.

Now, the maze device is described by referring to FIGS. 2-7. The maze device comprises a round case 1 and a circuit control system. Several partitions 2 are provided between an inner wall and a central pillar of the round case 1, thus the round case 1 is divided into a plurality of data collecting sections and a destination section. At the bottom of each partition 2 is provided with several doorways 13, which looks identical. As shown in FIG. 1, it is the key point to improve the maze device that, a rotary wheel 6 is arranged at the bottom of case 1, a motor 4 is arranged on the central pillar, the output shaft of the motor 4 is fastened to the center of rotary wheel 6 along the axis of central pillar, and the rotary wheel 6 can rotate around the central pillar driven by the motor 4. At the lower part of the frame in the case 1 is equipped with several pulleys 12, which rotate the wheel, and support the rotary wheel 6, moreover never affect the rotating thereof. On the top of the rotary wheel 6 is provided with a sieve-like supporting net 5, made of metal, plastic, or other materials. A water trough 8 is arranged under the rotary wheel 6, thus forming a feces collection and treatment equipment. A water pipe 7, on which uniformly distributed several spraying outlets 15, is arranged along the periphery of the trough 8. Under the trough 8 is provided with a support frame and a drain outlet, and in the trough 8 is provided with a water brush 9.

The circuit control system consists of a power, a Single Chip Microcomputer (SCM), a controller of vision and smell sense, a controller of automatic flushing and drainage system, and so on. SCM send signal to the motor 4, for driving the rotary wheel 6 to rotate. The motor 4 applied in the present invention, whose power is less than 100 w, is controlled by a Solid State Relay (SSR). SSR of 1000 w is adopted in the present invention. The SCM control the relays indirectly via a MOS transistor. The instruction of SCM to control the motor is generated from the command transited from the upper computer through a CAN bus. A transition interface circuit of CAN & RS232 enables to convert data between CAN protocol and RS232 protocol. The command of upper computer is sent to each node via said system. After received a control signal transited from P3.6 (I/O) of AT89S51 microcomputer, the controller of the automatic flushing and drainage system (in the feces collection and treatment system) regulates the controller of BFC-2 electrical valve, then switches open/close of the electrical valve arranged on the feces collection and treatment system. Thus, the water pipe 7 arranged on the trough 8 of said feces collection and treatment system is connected or disconnected to water resource, and the water resource flushes the drain system, especially the trough, at regular time. The sewage discharges from the drain outlet 16. The upper part of water brush 9 is fixed on the bottom of the rotary wheel 6, and the lower part of the brush contacts the side wall and the base of trough. The water brush 9 rotates with the rotation of rotary wheel 6, the lower part of the brush washes the trough and removes the excrement of animals. The smell influence on the experiment result could be eliminated. In the odor releasing unit, SCM control a LCD screen 3 and an odor controller via the controller of vision and smell sense. After detected a smell signal by SCM, fresh air is supplied to a mechanical arm equipped on the training system, via an air compressor, a control valve, an odor generator, a pressure reducing valve. Then the fresh air is supplied to an odor tank provided in the maze by the mechanical arm.

In a typical or classical structure of maze device in the present invention, 6 partitions is arranged, and divided the round case 1 into six equal angle sections, A, B, C, D, E and F, including 5 data acquisition sections and a destination sections. At the bottom of each partition is provided with 4 doorways distributed at a certain distance, on each partition is provided with a LCD screen. A feed trough 14 is set in the destination section. Two opposite-type photoelectric sensors are provided at each doorway under the partition, in front of the doorway, and the other behind the doorway, respectively. Since two sensors send signal after "OR" Boolean operation, the direction of rats passing through the doorways can be detected, and the track of rats' movement can be detected. For the sake of inflicting light and sound stimulation on rats, SCM control the grid electrode of the MOS transistor via I/O interface, and regulate the sound frequency and the light intensity, during that the control of sound resource and light resource (LCD screen) is realized. Furthermore, as a receiver unit, SCM receive digital massage transited from main control unit, extract instructions from said digital massage, and generate sound stimulation and light stimulation. Controlling data extracted from said digital massage include sound frequency, light intensity, etc. Visual stimulating unit employ a ViSaGe visual stimulating generator existed in the prior art. Since 14 bitDCAs image output technology applied in ViSaGe, it is guaranteed that the visual stimulating image sent from ViSaGe has accurate color, precise brightness, and shows at correct time. And it is guaranteed that the image does not drop, even the image is switched very fast. The CRS MATLAB toolkit makes it is convenient to output visual stimulating image programmed in MATLAB language. Meanwhile, various interfaces make ViSaGe can works simultaneously with other units, such as Resonse Box, Eye Tracker, EEG, Optptrak, fMRI, etc. The feed trough 14 is a round barrel with grids on its side. One undersurface of the trough is attached to a smooth partition plate, and the other undersurface opposite has an opening of the feed trough. Through a foldable half round top surface, food is put into the feed trough. At outside the circular side of the feed trough is provided with a circular sleeve, divided into two parts, which can separate and reveal the grids, and controlled by the circuit control system. As a reward for completing training task, animal get food under the grids of the feed trough, when circular sleeve opened. After certain interval (10 s), power is turn off, and the sleeve is shut down to block the grids. Animals can't get food anymore.

Figure 8:
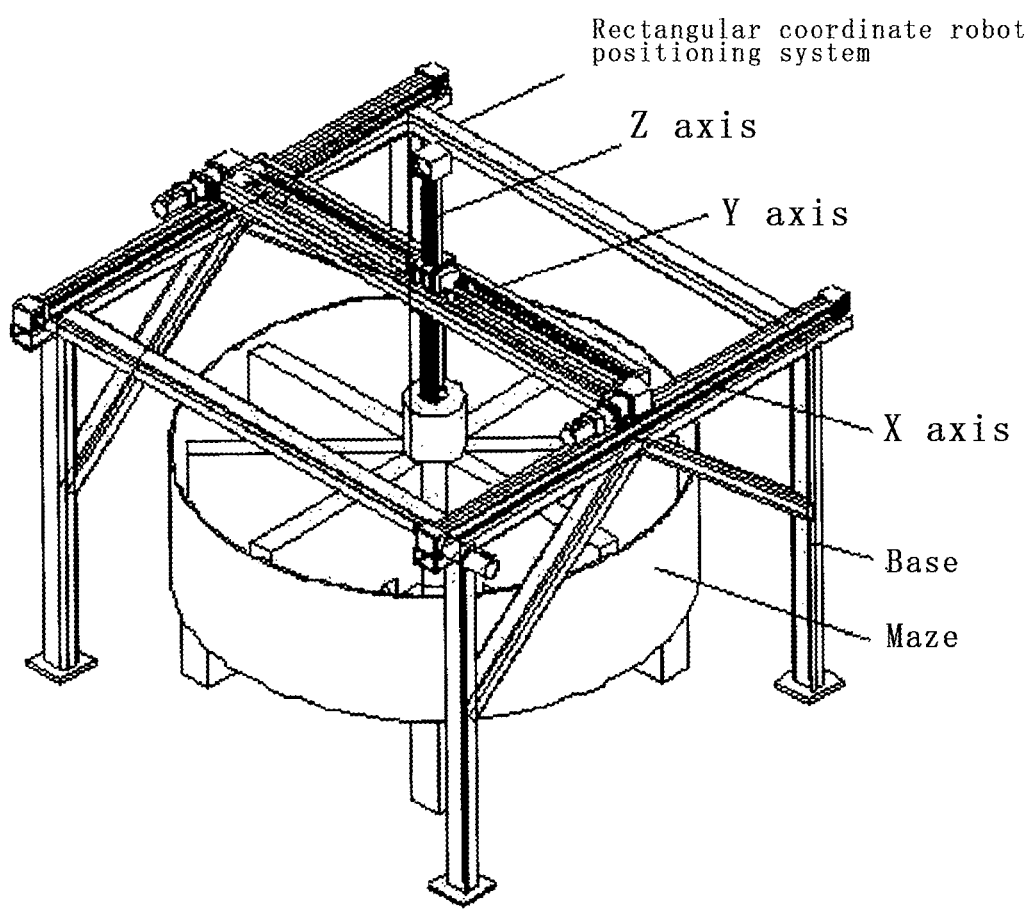
FIG. 8 is a configuration sketch of the automatic stimulating unit with mechanical arm applied in the present invention.

The stimulating device in the present invention consists of two components, an automatic mechanical arm stimulating unit and a remote control stimulating unit. Now, the automatic mechanical arm stimulating unit is described, referring to FIG. 8-12, which comprises a rectangular coordinate robot positioning system, a PLC control system, a rat position detecting system, and a stimulating system. The rectangular coordinate robot positioning system is established based on a quick linear positioning mechanism produced by BAHR Germany, moves in three directions x, y, and z, and enables accurately positioning at any spatial point. The x direction, y direction and z direction of the rectangular coordinate robot are constituted of a linear positioning unit driven by synchronous toothed belt, which is produced by BAHR Germany. The greatest moving speed on each direction reaches 2.0 m/s. The driving force is provided by 3 servo motors, produced by Panasonic Japan, the maximum speed of which reach 3000 r/min, and the operating instruction of which generated by the PLC movement control module of the control system. Said control system can respond the command of the upper computer in 0.01 sec. The structure of the rectangular coordinate robot is shown in FIG. 8. As one of the most professional manufacturer in Germany, even in the world, BAHR has focused in research and development of linear positioning system for decades, has got good reputation in this field, products of which is widely applied in various industry, such as automobile, electronic, electrical, detection, medical, aerospace, and food production lines, etc.

Figure 9:
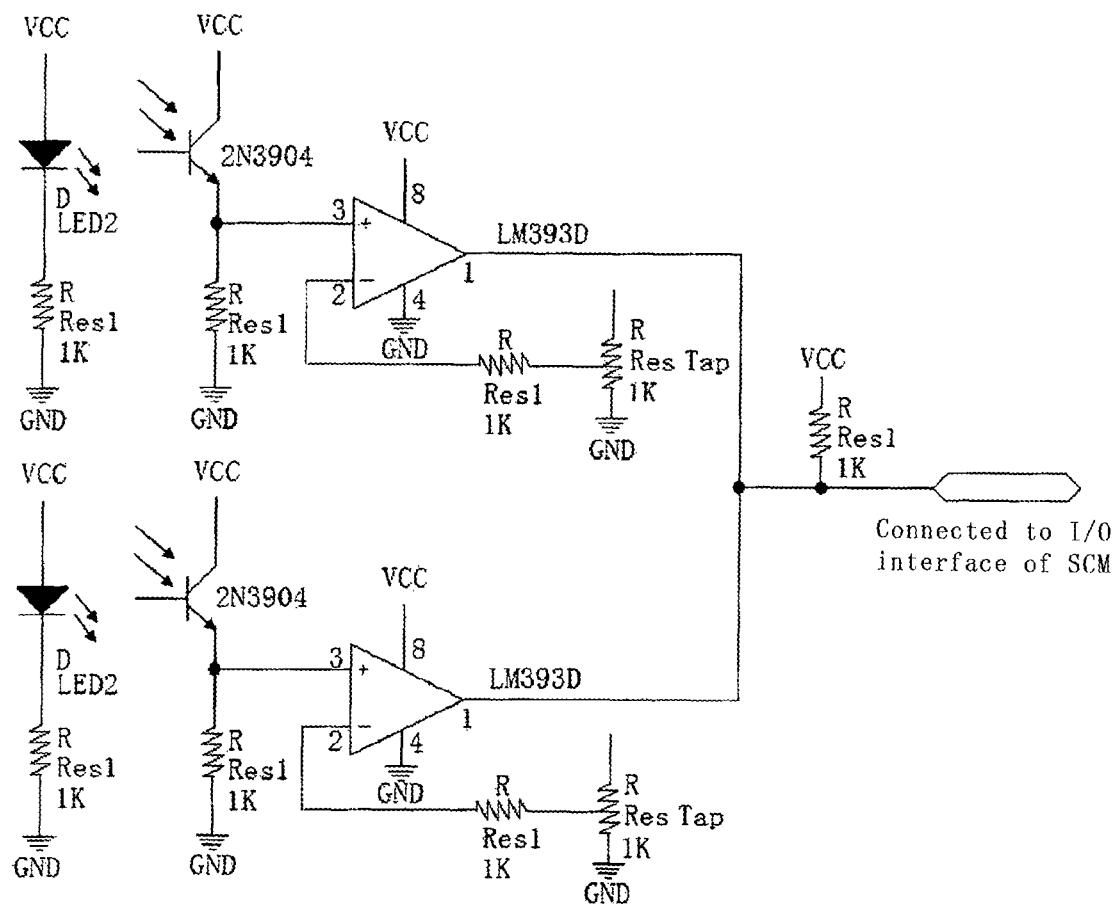
FIG. 9 is a control circuit schematic diagram of single detecting unit, in the rat position detecting system, which is applied in the automatic stimulating unit with mechanical arm.

The rat position detecting system consists of 4 opposite-type photoelectric sensors placed in front or behind of the doorways. Two sensors, arranged on the top and at the bottom, constitute a detecting unit. Two detecting units form two detecting spots, distributed in front or behind of the doorway. As a result, detection failure can be prevented from, if rats jump through or crawl away. Since two detecting units form two detecting spots distributed in front or behind of the doorway, the directions of rats passing through the doorways can be detected. The control circuit schematic diagram of single detecting unit is shown in FIG. 9. The infrared transmitting and receiving sensors is in service, low lever is input to the non-inverting inputs of the amplifier, then low lever is input to I/O interface of SCM, via the output, and the stimulation do not generate, when rats haven't past through the doorway. However, high lever is input to the non-inverting inputs of the amplifier, then high lever is input to I/O interface of SCM, via the output, and the stimulation is generated, when rat passing through a non-green doorway. Only several microseconds after rats past through the doorway, a signal of rat's position is feedback to an upper PLC, by corresponding photoelectrical sensor. Based on the position signal, current position of rat is calculated rapidly, by the upper PLC.

Figure 10:
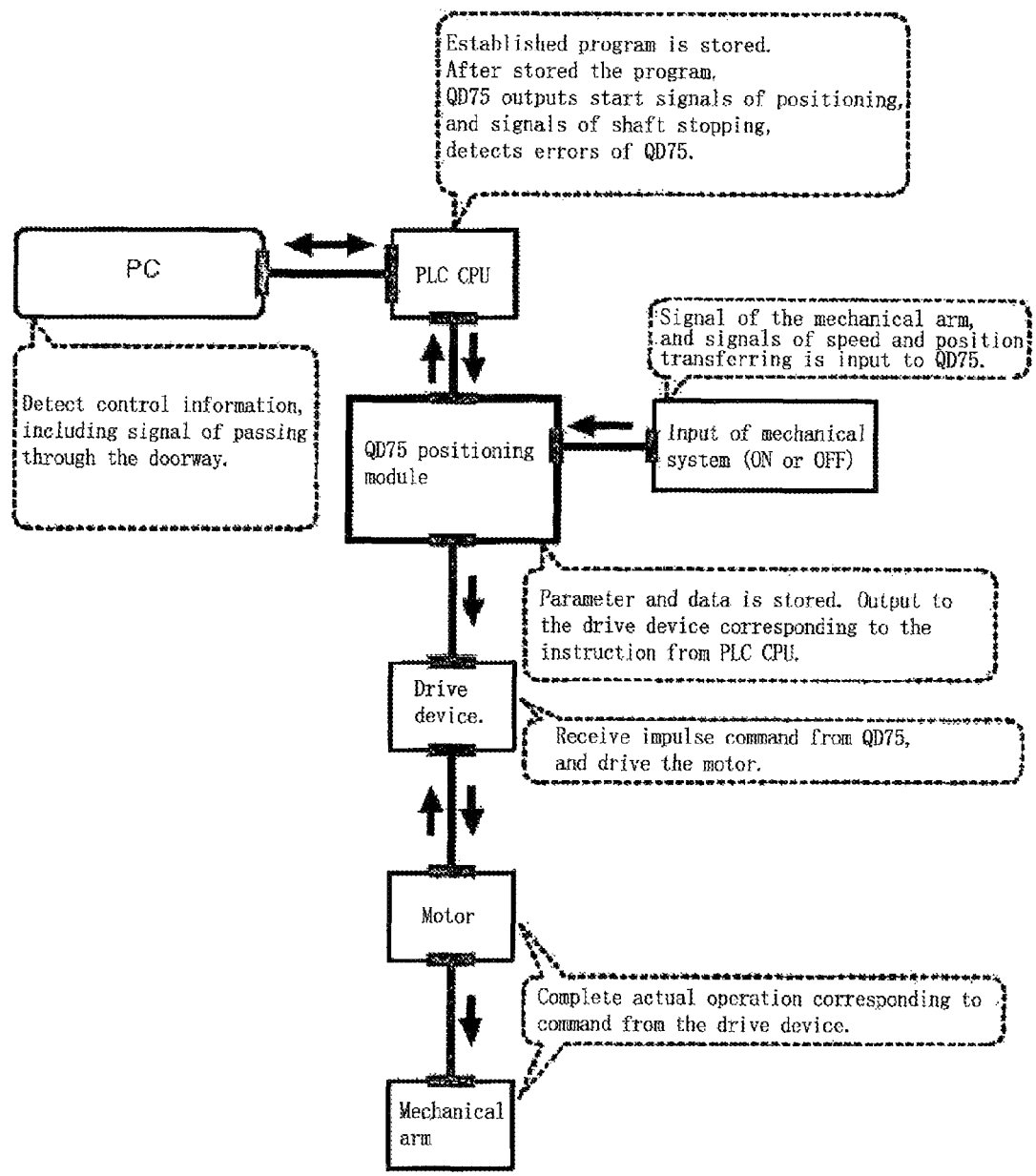
FIG. 10 is control block diagram of the PLC control system, which is applied in the automatic stimulating unit with mechanical arm.
Figure 11:
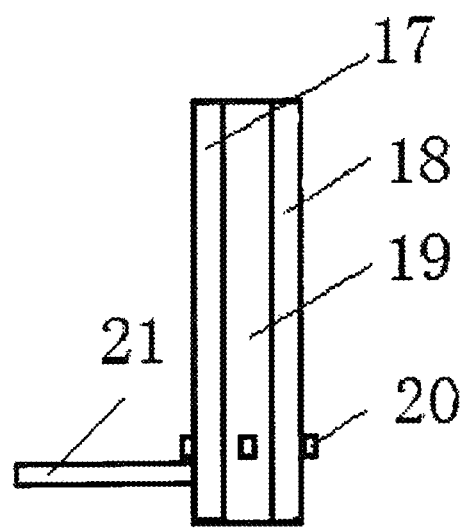
FIG. 11 is a configuration sketch of stimulating unit (mechanical arm) in the automatic stimulating unit with mechanical arm.
Figure 12:
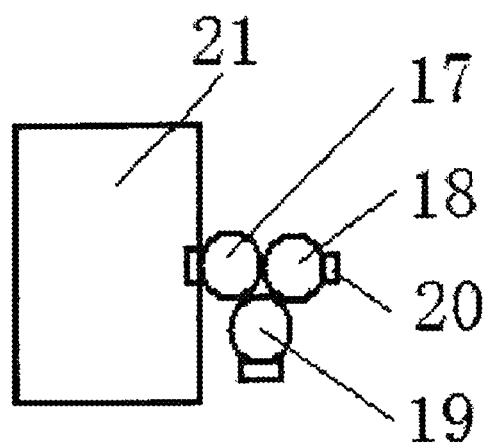
FIG. 12 is a bottom view of the arm shown in FIG. 11.
Figure 13:
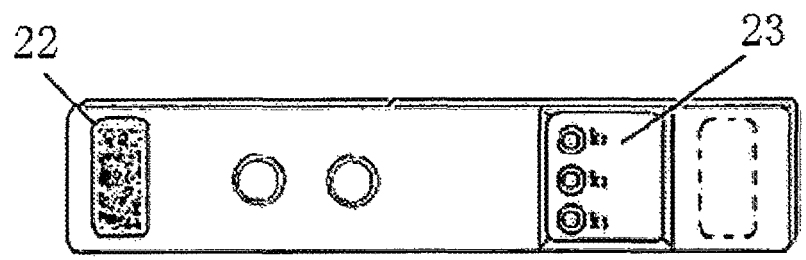
FIG. 13 is a front view of detailed structure drawing of the remote control stimulating unit applied in the present invention.
Figure 14:
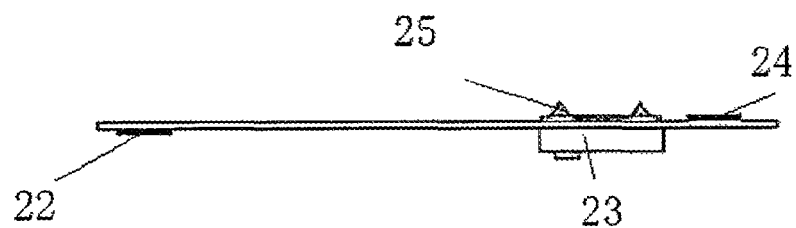
FIG. 14 is a top view of the unit in FIG. 13.
Figure 15:
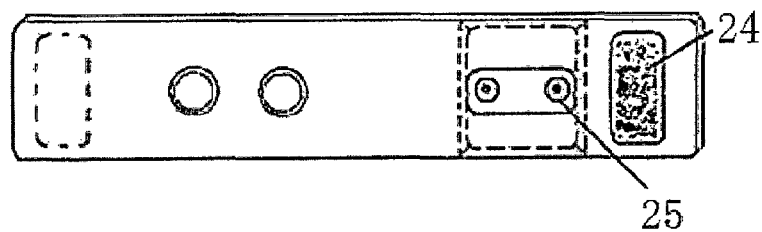
FIG. 15 is a rear view of the unit in FIG. 13.
Figure 16:
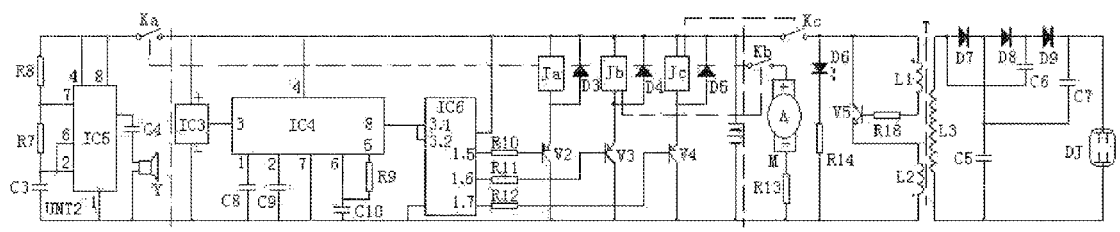
FIG. 16 is an electrical schematic diagram of the remote control stimulating unit.
Figure 17:
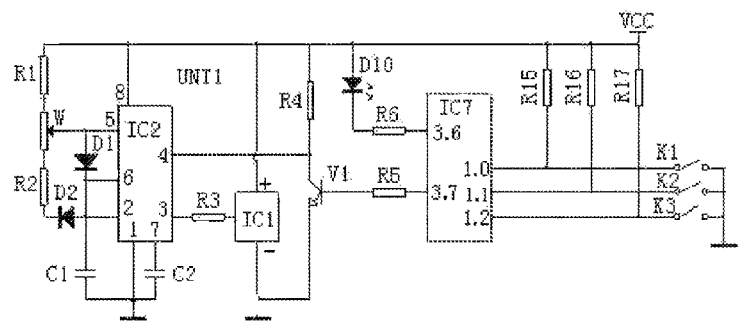
FIG. 17 is a circuit diagram of the wireless remote control transmitter in the remote control stimulating unit.
Figure 18:
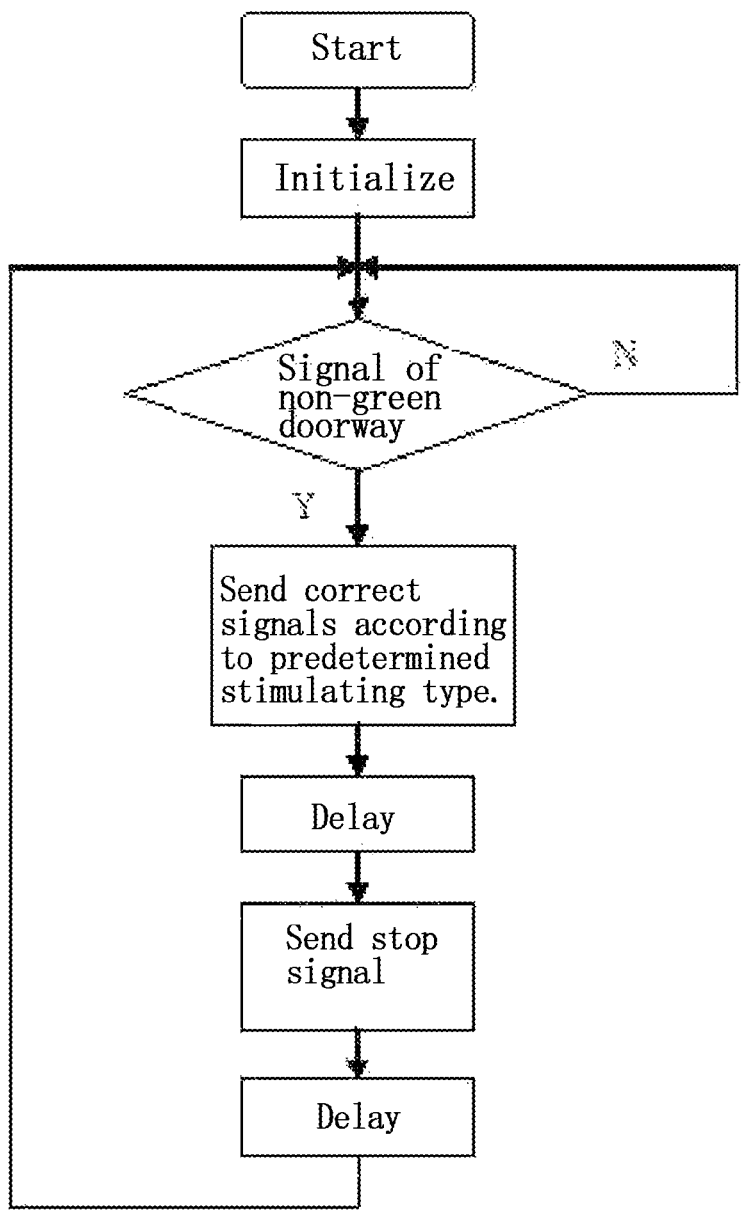
FIG. 18 is a program flow chart of the wireless remote control transmitter module in the remote control stimulating unit.
Figure 19:
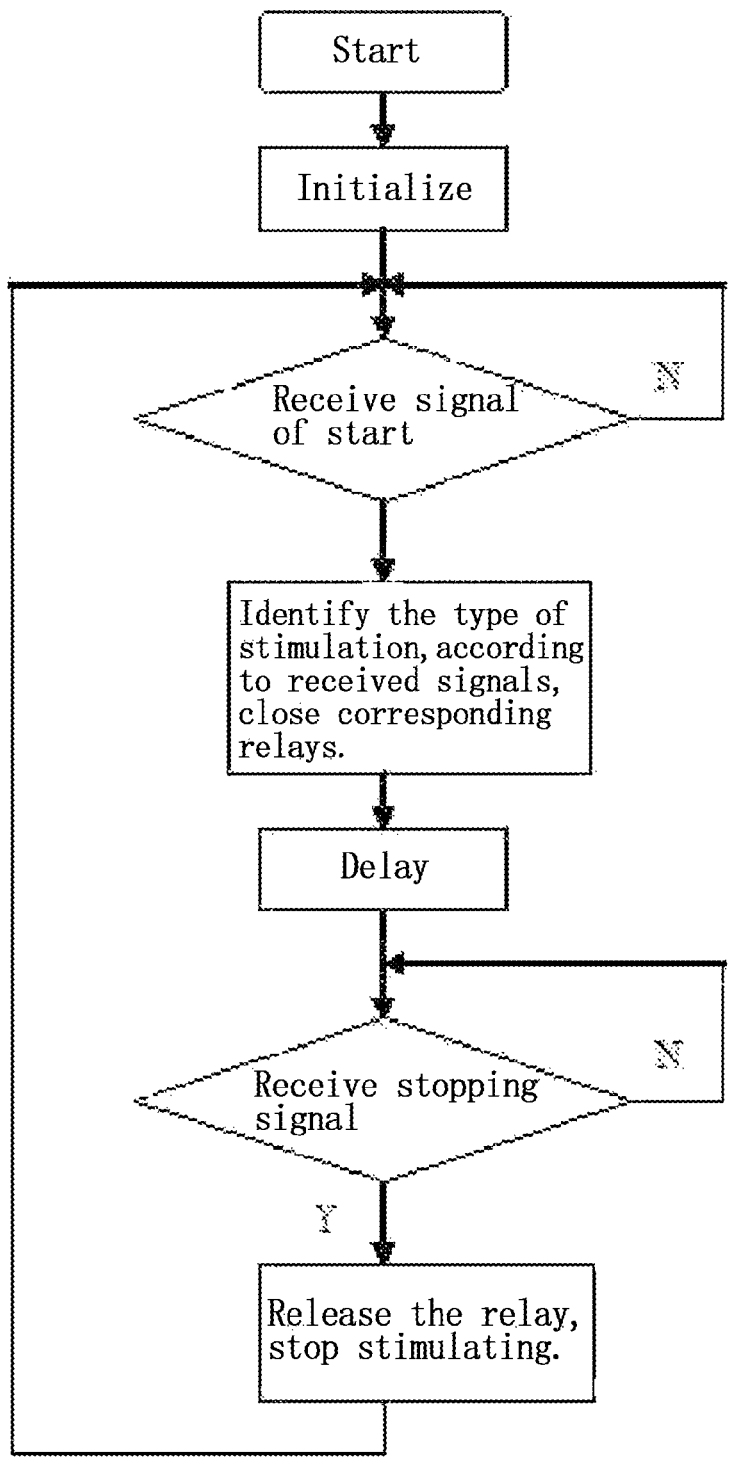
FIG. 19 is a program flow chart of the wireless remote control receiver module in the remote control stimulating unit.
Figure 20:
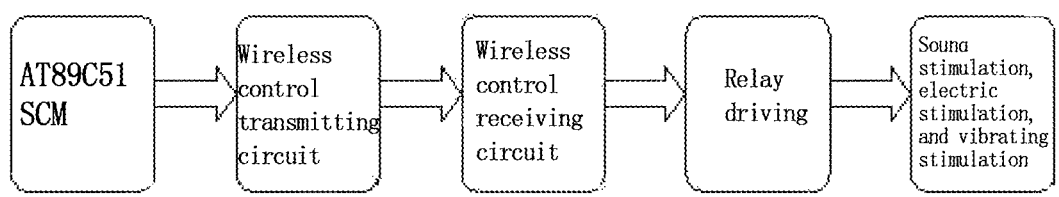
FIG. 20 is a function diagram of the remote control stimulating unit.
Figure 21:
FIG. 21 is an integrated schematic diagram of the remote control stimulating unit, which is tied on the mouse.

PLC control system comprises a CPU module and a movement control module. The CPU module (Mitsubishi Q00) and the movement control module (Mitsubishi QD75-D4) are communicated via a main board. Based on the position signal transmitted from the rat position detecting system, current position of rat is calculated by the PLC module. Compared said current position to the position of rectangular coordinate robot positioning system, a path between which can be calculated. Then the movement control module send moving instruction to a servo drive system, by which the terminal stimulating mechanism, in the rectangular coordinate robot positioning system, is driven to a correct position. What should be described is that: two detecting units are equipped in front and behind the doorway; when rat entering a doorway from the first detecting unit, the control system drives the rectangular coordinate robot positioning system moving to opposite of corresponding doorway; and when rat passing through the second detecting unit of said doorway, operating instruction is sent according to experiment procedure, i.e. inflicting certain variety of stimulating. As shown in FIG. 10, established program can be stored in the CPU module of PLC. After stored program, the CPU module can output a positioning start signal and a shaft stop signal to the movement control module (QD75 positioning module), and can recognize an error operation of the QD75 positioning module. The PC in CPU module can detect some control information, including signal of passing through the doorway. Signals of the arm, and information about speed and position transferring is input to the QD75 positioning module, via input switches of the mechanical system, then is output to a drive device corresponding to the instruction from CPU. After received said instruction, the drive device makes motors work. Then motors drive the mechanical arm to inflict stimulation.

The stimulating system of said mechanical arm stimulating unit includes 3 kinds of terminal stimulating mechanism, which is in form of a mechanical arm with 3 tubes, corresponding to water, gas, and food stimulation respectively. As show in FIGS. 11-12, a water channel 17, a gas channel 18, and a food channel 19 are provided in the mechanical arm. At the end of mechanical arm is provided with a removable LCD screen 21. The stimulating system controls supplying of water, gas, and food, via PLC control system. When located in the position of rat, the electromagnetic valve 20 equipped at the end of mechanical arm opens, and inflicts corresponding stimulation, according to the signal of passing through the doorway, which is send from PC.

Now, referring to FIGS. 13-21, the remote control stimulating unit is described, which comprises an electric stimulating module, a sound stimulating module, a mechanical vibrating stimulating module, a wireless transmitting module, a wireless receiving module, and a relay driving module. These 6 modules is assembled and fixed on a carrier, which is tied on the rat's body. Said carrier tied on the rat's body adopts a piece of elastic canvas, on which is provided with a stimulating electrode 25, and at the end of which is provided with two hook loops 22, 24.

The electric stimulating module consists mainly of a normally open contact Kc controlled by a relay Jc, a triode V5, a transformer T, resistances R14, R18, an LED D6, diodes D7, D8, D9, capacitances C5, C6, C7, and an electrode DJ.

The mechanical vibrating stimulating module consists mainly of a motor M, a resistance R13, a normally open contact Kb controlled by relay Jb.

The sound stimulating module consists mainly of 555 time-base circuit, resistances R7, R8, capacitance C3, a normally open contact controlled by relay Jb, a capacitance C4, and a loudspeaker.

The relay driving module consists mainly of SCM IC6, relays Ja, Jb, Jc, triodes V2, V3, V4, diodes D3, D4, D5, and resistances R10, R11, R12.

The wireless receiving module consists mainly of a wireless remote control receiver IC3, a decoding integrated chip IC4, capacitances C8, C9, C10, and a resistance R9.

The wireless transmitting module consists mainly of a wireless remote control transmitter IC1, a 555 time-base integrated circuit IC2, diodes D1, D2, D10, resistances R1, R2, R3, R4, R5, R6, R15, R16, R17, a potentiometer W, capacitances C1, C2, switches K1, K2, K3 and SCM IC7.

The circuit of the remote control stimulating unit connects as following.

In the sound stimulating module, the capacitance C3 is connected between pins 1 and 2 of the time-base circuit (NE555). Pins 2 and 6 of the 555 time-base circuit, after be shorted out, connects with the resistance R7. The resistance R7 is connected between pins 6 and 7 of the 555 time-base circuit. The resistance R8 is connected between pins 4 and 7 of the 555 time-base circuit. Pins 4 and 8 of the 555 time-base circuit is shorted out, then is connected with the normally open contact Ka controlled by the relay Ja. After series connected with the loudspeaker Y, the capacitance C4 is inserted between the 555 time-base circuit and the ground. When said normally open contact Ka controlled by the relay Ja closed, the loudspeaker Y inflicts a sound stimulation.

In the wireless receiving module, the positive pole and negative pole of the wireless remote control receiver IC3, is connected to the positive pole and negative pole of power E. The negative pole of the wireless remote control receiver IC3 is connected to the ground, just the as the loudspeaker Y, the capacitance C3, pin 1 of the 555 time-base circuit IC5, capacitance C8, C9, C10, pin 7 of the decoding integrated chip IC4, and the collectors of triodes V2, V3, V4. The positive pole of the wireless remote control receiver IC3 and pin 4 of the decoding integrated chip IC4, is connected to the normally open contacts Ka, Kb, Kc of relays Ja, Jb, Jc and the transformer coil L1.

Moreover, pin 3 of the decoding integrated chip IC4 is connected to the wireless remote control receiver IC3. Pin 1 access to the ground through a capacitance C8, pin 2 accesses to the ground through a capacitance C9, and pin 6 accesses to the ground through a capacitance C10. Pin 7 accesses to the ground directly. Pin 6 accesses to the ground through a resistance R9 and a capacitance C10. P3.1, P3.2 of SCM IC6 is connected to pin 8 of the decoding integrated chip IC4. P1.5 of SCM IC6 is connected to the base of triode V2 through a resistance R10. P1.6 of SCM IC6 is connected to the base of triode V3 through a resistance R11. P1.7 of SCM IC6 is connected to the base of triode V4 through a resistance R12. The emitter of triode V2 is series connected with the relay Ja, which is anti-parallel associated with the diode D3. The emitter of triode V3 is series connected with the relay Jb, which is anti-parallel associated with the diode D4. The emitter of triode V5 is series connected with the relay Jc, which is anti-parallel associated with the diode D5.

In the mechanical vibrating stimulating unit, the resistance R13 is series connected to the motor M, which is inserted between the normally open contact Kb controlled by the relay Jb, and the ground. If the normally open contact Kb of the relay Jb is closed, the motor M makes mechanical vibration, and inflicts stimulation.

In the electric stimulating module, the collector of triode V5 is connected with the switch Kc and the input at one end of the transformer primary coil L1. The base of triode V5 is connected with the other end of the transformer primary coil L1 through the resistance R18. The emitter of triode V5 is connected with one end of the transformer primary coil L2. The transformer secondary coil is series connected to diodes D7, D8, D9, and the metal electrode DJ. The diode D7, series connected with the diode D8, is parallel connected with the capacitance C6. The diode D8, series connected with the diode D9, is parallel connected with the capacitance C7. The diode D8, series connected with the diode D8 and the electrode DJ, is parallel connected with the capacitance C5. If the normally open contact Kc of the relay Jc is closed, the electrode DJ inflicts stimulation on animals.

In the wireless transmitting module, a +12V regulated power is connected to the positive pole of the wireless remote control transmitter IC1, to the pin 8 of said 555 time-base circuit IC2, and to the resistance R1. The resistance R1, series connected with the potentiometer W and the resistance R2, and anti-series connected to the diode D2, is inserted between pin 2 of the 555 time-base circuit IC2 and the +12V regulated power. The potentiometer W is connected to pin 5 of the 555 time-base circuit IC2. The diode D1 is inserted between pin 5 and 6 of the 555 time-base circuit IC2. Pin 6 and 2 of the 555 time-base circuit IC2 is connected to the ground through the capacitance C1. Pin 1 of the 555 time-base circuit IC2 is connected to the ground directly. Pin 7 of the 555 time-base circuit IC2 is connected to the ground through the capacitance C2. The resistance R3 is inserted between pin 3 of the 555 time-base circuit IC2 and IN of the wireless remote control transmitter IC1. The negative pole of the wireless remote control transmitter IC1 is connected to the ground.

Using aforesaid modules, the present invention can be implemented. The wireless transmitting module sends wireless signals corresponding to the signals of animals passing through the doorway. After the wireless receiving module received the wireless signals, one variety of stimulating is selected, and the relay driving module works, then electric, sound, mechanical vibrating stimulation, or combination thereof, is inflicted on animals. Specific principle is described as following. The wireless transmitting module controls the NE555 time-base circuit IC2, via AT89C51 SCM IC7. The LED D10 is an indicator for signal transmitting. If P3.7 of the AT89C51 SCM IC7 output high lever, corresponding pins of the NE555 time-base circuit IC2 output low lever, the time-base circuit IC2 is reset, the wireless remote control transmitter IC1 does not send signal, and the LED D10 is off. If P3.7 of the SCM IC7 output low lever, the time-base circuit IC2 works, the wireless remote control transmitter IC1 send a set of signals, including N times of signals at intervals, and the indictor LED D10 turns on. N≥1.

The wireless remote control receiving module receives every set of signals via the wireless remote control receiver IC3. AT89C2051 SCM IC6 of the relay driving module identifies the variety of stimulation selected, according to the times of each set of signals, controls the normally open contacts Ja, Jb, Jc of relays to close, and inflicts electric, sound, vibrating stimulation, or combination thereof.

Manual switches K1, K2, K3 are provided corresponding to sound, vibrating and electric stimulation. AT89C51 SCM IC7 of the wireless transmitting module controls the time-base integrated circuit IC2 to sent correct times of wireless signals, according to the setting state of K1, K2, and K3.

In operating process, AT89C51 SCM of transmitting module controls the NE555 time-base integrated circuit IC2 to send a set of signals with N (N≥1) times of signals at intervals (i.e. 10 ms). AT89C2051 SCM identifies the type of stimulation, according to the times of each set of signals, controls the relays to close, and inflicts stimulating, detailed shown in Tab. 1.

When animals start test in the maze device, the receiving and stimulating unit is tied onto the back of rat. When rat past through the non-green doorway, a high frequency oscillation circuit, consisted of the triode V5 and the transformer T, works and turns direct current of the power E to high frequency alternating current. Risen voltage by the transformer T, and voltage triple rectified by diodes D7-D9 and capacitances C5-C7, the high frequency alternating current is applied to the metal electrode DJ. And the electrode inflicts electric stimulation on rat. The 555 time-base circuit composed of the sound stimulating circuit. The mechanical vibrating is generated by a micro mobile phone vibration motor.

In selection of components, triode V5 adopts 8050, and V2, V3, V4 adopt A781. D6, D10 adopt red LED diodes. D7-D9 adopt 1N4007 silicon rectifier diodes. The high frequency transformer T can be manufactured by self. R13 adopts 1 W metal film resistance. R14, R18 adopt RTX-1/8W carbon film resistance. And the else adopt 1/4W carbon film or metal film resistance. RP adopts a solid variable resistance. C5, C6, C7 adopt T630 polyester capacitors, and the else adopt monolithic capacitors. D1, D2, D3, D4, and D5 adopt 1N4148 silicon switching diodes. IC1 adopts integrated wireless remote control transmitter T630, IC2 adopts NE555 time-base integrated circuit, IC3 adopts wireless remote control receiver T630 matched up with IC1, and IC4 adopts LM567 decoding integrated circuit. Ja, Jb, Jc adopt direct current relays. Moreover, NE555 time-base integrated circuit is used as IC5, AT89C2051 SCM as IC6, AT89C51 as IC7, a loudspeaker as Y, and micro DC motor as M.

Secondly, typical training process of the training system in the present invention is completed as following.

The case of the maze device has a diameter of 200 cm, and a height of 80 cm, in the profile size. The space of the maze is divided equally by 6 partitions, at the bottom of which is provided with 4 passing through caves (doorways), distributed at a certain distance. Two infrared photoelectric sensor units are equipped at each doorway. At the bottom is provided with the sieve-like net for supporting rats or robot mice moving. A motor is provided in the central shaft to rotate the sieve-like net. So, rat or robot mouse entered into the maze, moves among doorways under these 6 partitions. Meanwhile, the sieve-like net rotates. Movement of the training system is constituted. The passing through caves has a height of 90 mm, a width of 110 mm, and a depth of 60 mm. The distance between caves is 100 mm. The holes of sieve-like net has a size of 12*12 mm. Said training system propels rat completing passing through training, through the rotating of rotary wheel controlled by the motor. How to realize the function of said maze system is shown in FIG. 1.

1. Setting rules of training system. Rules should be set before each test, including initial section of rat, property of each doorway (e.g. green or red doorway represent YES or NO to pass through), and offering a single or combined reward according to situation of completing the task.

a. Setting the initial section. The initial section is set to facilitate statistical work.

b. Setting green or red doorway. The property of 24 doorways is set, that is YES or NO to pass through.

c. Selecting variety of stimulation. The stimulation includes sound, light, electric, water, gas, food, image, odor, etc. If rat pass through a non-green (red) doorway, punishment is applied, and if rat pass through a green doorway successfully, reward is offered. Actually, several kinds of stimulation are inflicted via the mechanical arm and the remote control stimulating unit, in the training system. 3 kinds of terminal stimulating mechanisms are equipped on the mechanical arm, on which 3 tubes are provided, corresponding to water, gas, and food stimulation. When located in the position of rat, the electromagnetic valve equipped at the end of mechanical arm opens, and inflicts corresponding stimulation, according to the signal of passing through the doorway, which is send from PC. The remote control stimulating unit can be controlled remotely. When rat start test in the maze device, the receiving and stimulating unit, tied onto the back of rat, inflicts the predetermined stimulation to punish the rat, if the rat pass through a non-green (red) doorway, including sound, electric, mechanical vibration stimulating.

d. Setting duration of stimulation. The duration of each stimulating should be set. Optionally, it is allowed to finish the stimulation by hand after starting. And, e. Setting rotating speed of the rotary wheel. The rotating speed of the rotary wheel should be set.

2. Data acquisition. Information about rat passing through doorways should be collected in each session task.

a. Collecting the course of each session. It is defined as a session that rat starts from the start section and gets back. Resorted to this function, the course of each session, along which the rat goes, can be collected.

b. Calculating the amount of successes and failures. It is defined as successes that rat complete the course through green doorways. It is defined as failures that rat pass through any red doorway. Resorted to this function, the amount of successes and failures can be calculated. And, c. Calculating the amount of green or red doorways past through.

Resorted to this function, the amount of green or red doorways, rat past through, can be calculated.

3. Process displaying. The property of each doorway of the training system, and the position of rat, can be displayed visually.

a. Displaying the green or red doorway. The properties of doorways can be displayed using the difference of the doorways. And, b. Displaying the moving process of rat. The current position of the rat can be displayed.

4. File management. Make backups of information gathered by statistics.

a. Generating statistical report. The statistical information is exported to Excel sheet.

b. Generating system logs. The system logs include the time and content of each instruction sent or received by the upper computer. (When did the rat pass through the doorway, when and what stimulation is inflicted.)

When the cursor located at the position of rat, it changes into a cross. Then the cross can be dragged to set the initial section.

The program of software in the present experiment system is completed by using C# Language and .NET Frame. The build environment is Visual Studio 2008. The database adopts MySQL.

Thirdly, the present invention is compatible to network operation. The setting and operation of the system can be controlled remotely.

Client/Server mode. In an information system based on early C/S mode, a complete database application system is divided into 3 main parts, including Client, Server, and application. The connection and the data delivering between the application and the server are completed via network. The core idea of this structure is in that, the application of client only sends data request to the server, and all other operations are processed by the server. At last, processed result is return to the application of client. The process done by the server is invisible for the application of client. So, the client and the server work in cooperation, and complete the application distributed and together.

The mainly feature of two layer Client/Server mode is that the client and the server work in cooperation. The disadvantage is that, when the client send request to the server, the server only complete query task from the client, and return the result. Since, what is transmitted in the network, are the data request of the client and the process result return from the server, other than the whole database document, the network load of the workstation can be reduced, and the efficiency of the remote client low-speed connected can be promoted.

Since the database adopts a centralized management mode, various platforms can be used as the client when it access to the database via SQL Language, such as PC, Macintosh, and UNIX workstation. Moreover, various operating systems can be used, including Windows, UNIX, OS/2, etc. It is not need to change the client program, or very little changes of the client program need to be done, even though the database structure or the database platform is changed. Through these features, it is concluded that, the database platform is not associated with the workstation, and that the client is not associated with the client program. The database adopts a transaction based RDBMS, maintains the transaction logs and database backup/recovery mechanism. Thus, the database can be maintained well, and the database integrity can be guaranteed.

The development of database application is divided logically into 3 phases, including a data expression layer, a logical application layer, and a data service layer. Aforesaid traditional two layers Client/Server can be augmented horizontal to obtain a Client/Server structure with 3 layers or more.

Communicating protocol. Because of the uncertainty in communication, for the sake of transmitting without failure, stop-and-wait protocol is applied, and CRC check is applied in the communicating. In the stop-and-wait protocol, after received correct data, the receiver returns an acknowledgment frame (ACK), then the transmitter send next data. If the receiver received an error data, returns a negative acknowledgement (NAK), then transmitter sends again. When the data is lost, the transmitter sends again overtime. It is guaranteed that the receiver connects to the transmitter without error. For the sake of checking the data, CRC check is applied, with 8-bit checking code. The frame size is defined as 24-bit, 3 bytes. The first byte is control digit, the second byte is data digit, and the third byte is check digit. The communication between 22 control nodes and the main communicating node applies token bus. Main unit cyclically scans all sub-units. If transaction happened in one sub-unit, the sub-unit occupies the token bus and communicates with the main unit.

Generally speaking, as an animal memory training system, the present invention has ideal experiment effect, and is significant in research of neurophysiology, neuropharmacology, psychology field, etc.

TABLE 1

| Serial No. | Times of Signals in the Set | Variety of Stimulation |
|---|---|---|
| 1 | 1 | Sound |
| 2 | 2 | Vibrating |
| 3 | 3 | Electric |
| 4 | 4 | Sound & Vibrating |
| 5 | 5 | Sound & Electric |
| 6 | 6 | Vibrating & Electric |
| 7 | 7 | Sound, Vibrating & Electric |

What is claimed is:

1. An animal memory training system with closed rotary maze, comprising:

a maze device and a stimulating device; several partitions are provided between an inner wall and a central pillar of a round case in said maze device, thus said round case is divided into a plurality of data collecting sections and destination sections; at the bottom of each partition is provided with several doorways distributed at equal distance, which looks identical; is characterized in that, a rotary wheel is arranged at the bottom of case in said maze device, a motor is arranged on the central pillar, the output shaft of the motor is fastened to the center of rotary wheel along the axis of central pillar, and the rotary wheel rotates around the central pillar driven by the motor, at the lower part of the frame in said case is equipped with several pulleys supporting the rotary wheel, on the top of the rotary wheel is provided with a sieve-like supporting net;

the stimulating device consists of an automatic mechanical arm stimulating unit and a remote control stimulating unit;

said automatic mechanical arm stimulating unit comprises four components, including a rectangular coordinate robot positioning system, a PLC control system, a rat position detecting system, and a stimulating system;

said rat position detecting system consists of four opposite-type photoelectric sensors placed in the doorways of the maze device; two sensors, arranged on the top and at the bottom of the doorways, constitute a detecting unit, and two detecting units form two detecting spots, distributed in front or behind of the doorway; said stimulating system includes three kinds of terminal stimulating mechanism, which is in form of a mechanical arm with three tubes, corresponding to water, gas, and food stimulation respectively; said stimulating system controls supplying of water, gas, and food, via PLC control system; when located in the position of rat, the electromagnetic valve equipped at the end of mechanical arm opens, and inflicts corresponding stimulation, according to the signal of passing through the doorway, which is sent from PC;

said remote control stimulating unit comprises an electric stimulating module, a sound stimulating module, a mechanical vibrating stimulating module, a wireless transmitting module, a wireless receiving module, and a relay driving module; the electric stimulating module, the sound stimulating module, the mechanical vibrating stimulating module, the wireless transmitting module, the wireless receiving module, and the relay driving module; are assembled and fixed on a carrier, which is tied on the rat's body; said wireless transmitting module sends wireless signals corresponding to the signals of rats passing through the doorway, after the wireless receiving module received the wireless signals, one variety of stimulating is selected, and the relay driving module works, then electric, sound, mechanical vibrating stimulation, or combination thereof, is inflicted on rats.

2. An animal memory training system with closed rotary maze according to claim 1, is characterized in that,
   a water trough is arranged under the rotary wheel of the maze device, thus forming a feces collection and treatment equipment; a water pipe, on which uniformly distributed several spraying outlets, is arranged along the periphery of the trough; under the trough is provided with a support frame and a drain outlet; in the trough is provided with a water brush; under the case frame is provided with a supporting bracket with pulleys, the upper part of said water brush is fixed on the bottom of the rotary wheel, and the lower part of the brush contacts the side wall and the base of trough; the water brush rotates with the rotation of rotary wheel, the lower part of the brush washes the water trough.

3. An animal memory training system with closed rotary maze according to claim 2, is characterized in that,
   the circuit control system of said maze device consists of a power, a SCM, a controller of vision and smell sense, a controller of automatic flushing and drainage system;
   after receiving a control signal transited from SCM, the controller of the automatic flushing and drainage system regulates the controller of electrical valve, then switches open/close of the electrical valve arranged on the feces collection and treatment system; the water pipe arranged on the trough of said feces collection and treatment system is connected or disconnected to water resource, and the trough is washed at regular time; the sewage is discharged from the drain outlet; SCM send signal to the motor, for driving the rotary wheel 6 to rotate; the controller of vision and smell sense controls a LCD screen and an odor controller, after detecting a smell signal by SCM, fresh air is supplied to a mechanical arm equipped on the training system, via an air compressor, a control valve, an odor generator, a pressure reducing valve, then the fresh air is supplied to an odor tank provided in the maze by the mechanical arm of the training system.

4. An animal memory training system with closed rotary maze according to claim 1 or 2 or 3, is characterized in that,
   six partitions of the maze device is arranged, and divided the round case into six equal angle sections, including five data acquisition sections and a destination sections; at the bottom of each partition is provided with four doorways distributed at a certain distance; on each partition is provided with a LCD screen; And a feed trough is set in the destination section.

5. An animal memory training system with closed rotary maze according to claim 1, is characterized in that,
   the rectangular coordinate robot positioning system of the automatic mechanical arm stimulating unit is established based on quick linear positioning mechanisms, moves in three directions x, y, and z; the x direction, y direction and z direction of the rectangular coordinate robot are constituted of a linear positioning unit driven by synchronous toothed belt; and a servo drive system is provided as driving force to enable accurately positioning at any spatial point.

6. An animal memory training system with closed rotary maze according to claim 1 or 5, is characterized in that,
   the PLC control system of said automatic mechanical arm stimulating unit comprises a CPU module and a movement control module; the CPU module and the movement control module are communicated via a main board; based on the position signal transmitted from the rat position detecting system, current position of rat is calculated by the PLC module; compared said current position to the position of rectangular coordinate robot positioning system, a path between them can be calculated; then the movement control module sends moving instruction to a servo drive system, by which the terminal stimulating mechanism, in the rectangular coordinate robot positioning system, is driven to a correct position.

7. An animal memory training system with closed rotary maze according to claim 1, is characterized in that,
   at the end of mechanical arm in said automatic mechanical arm stimulating unit is provided with a removable LCD screen.

8. An animal memory training system with closed rotary maze according to claim 1, is characterized in that,
   the wireless transmitting module of the remote control stimulating unit consists of a wireless remote control transmitter, a time-base integrated circuit, a diode, a potentiometer, switches and SCM; the wireless receiving module consists of a wireless remote control receiver, a decoding integrated chip; the relay driving module consists of SCM, relays;
   the wireless transmitting module controls the time-base circuit, via the SCM; the LED is an indicator for signal transmitting; if P3.7 of the SCM output high lever, corresponding pins of the time-base circuit output low lever, the time-base circuit is reset, the wireless remote control transmitter does not send signal, and the LED is off; If P3.7 of the SCM output low lever, the time-base circuit works, the wireless remote control transmitter send a set of signals, including N times of signals at intervals, and the indictor LED turns on; N>I;
   the wireless remote control receiving module receives every set of signals via the wireless remote control receiver; the SCM of the relay driving module identifies the variety of stimulation selected, according to the times of each set of signals, controls the normally open contacts of relays to close, and inflicts stimulation.

9. An animal memory training system with closed rotary maze according to claim 1, is characterized in that,
   said manual switches are provided corresponding to sound, vibrating and electric stimulation; the SCM of the wireless transmitting module controls the time-base integrated circuit to send correct times of wireless signals, according to the setting state of said manual stitches.

10. An animal memory training system with closed rotary maze according to claim 1, is characterized in that,
   said carrier tied on the rat's body adopts a piece of elastic canvas, on which is provided with a stimulating electrode, and at two ends of which is provided with two hook loops.

* * * * *